(12) United States Patent
Yamamura

(10) Patent No.: US 7,113,076 B2
(45) Date of Patent: Sep. 26, 2006

(54) METHOD AND SYSTEM FOR ASSISTING DRIVER OF MOTOR VEHICLE WITH DECELERATION CONTROL

(75) Inventor: Tomohiro Yamamura, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 128 days.

(21) Appl. No.: 10/356,500

(22) Filed: Feb. 3, 2003

(65) Prior Publication Data
US 2003/0176960 A1  Sep. 18, 2003

(30) Foreign Application Priority Data
Mar. 18, 2002 (JP) ............... 2002-073878

(51) Int. Cl.
*B60Q 1/00* (2006.01)
(52) U.S. Cl. ............... 340/425.5; 340/435; 340/436; 180/167; 180/169; 180/275; 180/282
(58) Field of Classification Search ............ 340/425.5, 340/435, 436; 180/167, 169, 275, 282
See application file for complete search history.

(56) References Cited

U.S. PATENT DOCUMENTS

| | | | |
|---|---|---|---|
| 6,216,082 B1 * | 4/2001 | Minowa et al. | 701/96 |
| 6,292,753 B1 | 9/2001 | Sugimoto et al. | |
| 6,622,076 B1 | 9/2003 | Eckert et al. | |
| 2001/0014845 A1 | 8/2001 | Minowa et al. | |
| 2001/0039472 A1 | 11/2001 | Isogai et al. | |

FOREIGN PATENT DOCUMENTS

| | | |
|---|---|---|
| EP | 1 101 647 A2 | 5/2001 |
| JP | 57-33048 | 2/1982 |
| JP | 57-167845 | 10/1982 |
| JP | 7-96806 | 4/1995 |
| JP | 8-16997 | 1/1996 |
| JP | 08-34326 | 2/1996 |
| JP | 10-338110 | 12/1998 |
| JP | 11-53686 | 2/1999 |
| JP | 11-227582 | 8/1999 |
| JP | 11-268621 | 10/1999 |
| JP | P2001-90831 A | 4/2001 |
| JP | 2001-347936 | 12/2001 |
| JP | 2002-013424 A | 1/2002 |
| JP | 2002-67904 A | 3/2002 |
| WO | 0 941 903 A2 | 9/1999 |

OTHER PUBLICATIONS

U.S. Appl. No. 10/336,802, filed Jan. 3, 2003, Hijitaka et al.

* cited by examiner

Primary Examiner—Julie Bichngoc Lieu
(74) Attorney, Agent, or Firm—McDermott Will & Emery LLP

(57) ABSTRACT

A system and method assists a driver of a motor vehicle. Driver operation, vehicle motion and vehicle environment are detected. The detected driver operation, vehicle motion and vehicle environment are evaluated. Based on the evaluation, the driver is prompted to effecting a change in driver operation by applying at least one of braking torque to the motor vehicle and additional reaction force at the accelerator. The change in driver operation is in such a direction as to restrain an increase in degree with which the obstacle is coming close to the motor vehicle.

27 Claims, 8 Drawing Sheets

METHOD AND SYSTEM FOR ASSISTING DRIVER OF MOTOR VEHICLE WITH DECELERATION CONTROL

BACKGROUND OF THE INVENTION

1. Field of the Invention

The present invention relates generally to motor vehicles, and more particularly to method and system for assisting a driver of a motor vehicle.

2. Description of the Background Art

Various driver assisting systems of the above kind are known. One example is disclosed in JP-A 8-34326, which fully brakes a motor vehicle independent of a driver of the vehicle upon determination of emergency out of manipulation of a brake pedal and a steering wheel upon or immediately after determination of potential hazard out of the range between the vehicle and an obstacle and the time rate at which the range was changing. This automatic brake is intended to assist brake torque needed in such emergency atmosphere. Another example is disclosed in JP P2001-90831A, which decelerates a motor vehicle independent of a driver of the vehicle by shifting down an automatic transmission upon or immediately after determination that deceleration of the vehicle is required. The information from a navigation unit and the range between the vehicle and an obstacle determine the need for such deceleration.

The above-mentioned driver assisting systems are common in changing the operation of a motor vehicle independent of a driver of the vehicle. The action required to change the vehicle operation is intrusive. Conditions where that action is required should therefore be avoided or minimized.

Accordingly, a need remains for method and system for assisting a driver that prompt a driver of a motor vehicle to effecting deceleration of the vehicle in compatible manner with the reaction of the driver.

An object of the present invention is to provide a vehicle driver assisting method and system that prompt a driver of a motor vehicle to effecting deceleration of the vehicle in compatible manner with the reaction of the driver.

SUMMARY OF THE INVENTION

The present invention provides, in one aspect thereof, a system for assisting a driver of a motor vehicle, comprising:

a plurality of sensing devices for detecting driver operation, vehicle motion and vehicle environment, the vehicle environment including an obstacle in a field around the motor vehicle;

a computing device coupled to the plurality of sensing devices for determining a degree with which the obstacle is coming close to the motor vehicle to determine a desired value of deceleration accounting for the determined degree; and a vehicle control application for carrying out a procedure to prompt the driver to effecting a change in driver operation, which change is in such a direction as to restrain an increase in the degree, the procedure including applying braking torque to the motor vehicle to subject the motor vehicle to the desired value of deceleration.

According to another aspect of the present invention, there is provided a method for assisting a driver of a motor vehicle having an accelerator, comprising:

detecting, on a substantially real-time basis, driver operation, vehicle motion and vehicle environment, the vehicle environment including an obstacle in a field around the motor vehicle;

evaluating the detected driver operation, vehicle motion and vehicle environment; and prompting, based on the evaluation, the driver to effecting a change in driver operation by applying at least one of braking torque to the motor vehicle and additional reaction force at the accelerator, which change is in such a direction as to restrain an increase in degree with which the obstacle is coming close to the motor vehicle.

BRIEF DESCRIPTION OF THE DRAWINGS

The present invention will be apparent from reading of the following description in conjunction with the accompanying drawings.

DETAILED DESCRIPTION OF THE INVENTION

Figure 1:
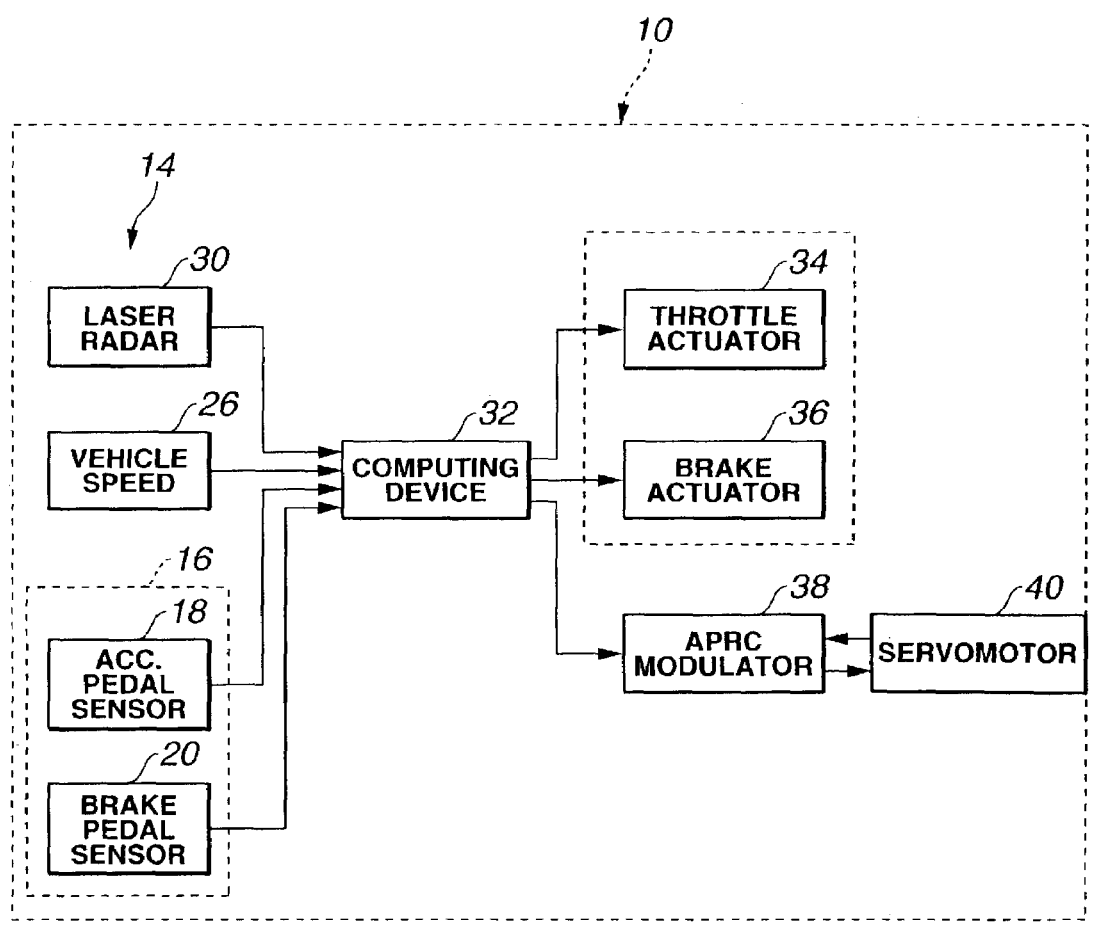
FIG. 1 is a control diagram showing control of one exemplary implementation of method and system for assisting a driver of a motor vehicle according to the present invention.
Figure 2:
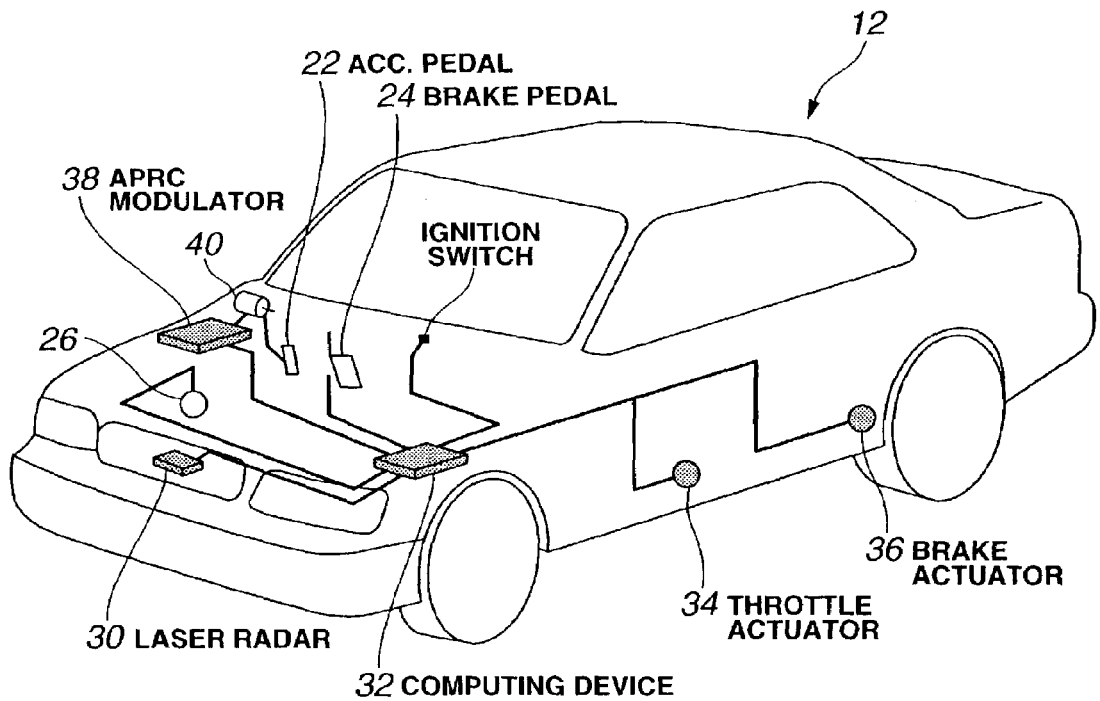
FIG. 2 is a view illustrating how hardware of the implementation in FIG. 1 is arranged on a motor vehicle.

Referring now in detail to an exemplary implementation of the present invention, a system and method 10 for assisting a driver of a motor vehicle 12 is disclosed as shown in FIGS. 1 and 2. Driver operation, vehicle motion and vehicle environment are detected. The detected driver operation, vehicle motion and vehicle environment are evaluated. Based on the evaluation, the driver is prompted to effecting a change in driver operation by applying at least one of braking torque to the motor vehicle and additional reaction force at the accelerator. The change in driver operation is in such a direction as to restrain an increase in degree with which the obstacle is coming close to the motor vehicle.

Detecting driver operation, vehicle motion and vehicle environment includes obtaining information indicated by a plurality of signals that include accelerator application, brake pedal application, vehicle speed, distance to the obstacle and relative speed to the obstacle. The driver assisting system 10 comprises a data acquisition system (DAS) 14 arranged on the vehicle 12.

As shown in FIG. 1, the DAS 14 includes sensing devices 16 for detecting driver operation. In this example, an accelerator pedal sensor 18 and a brake pedal sensor 20 are provided. The accelerator pedal sensor 18 generates a sensor signal indicative of information on accelerator application by the driver. The brake pedal sensor 20 generates a sensor signal indicative of information on brake pedal application by the driver. As shown in FIG. 2, the accelerator pedal sensor 18 senses the depressed position of an accelerator or an accelerator pedal 22, and the brake pedal sensor 20 senses the depressed position of a brake pedal 24.

The DAS 14 also includes a sensing device 26 for detecting vehicle motion. The sensing device is in the form of a vehicle speed sensor 26 that generates a sensor signal indicative of information on the vehicle speed. The DAS 14 also includes a sensing device 30 for detecting vehicle environment. The sensing device is in the form of laser radar 30 for detecting vehicle environment.

As shown in FIG. 2, the laser radar 30 is mounted to the vehicle 12 at a front bumper or a front grille thereof. It scans horizontally and laterally about 6 degrees to each side of an axis parallel to the vehicle longitudinal centerline, propagates infrared pulses forwardly and receives the reflected radiation by an obstacle, such as, a rear bumper of the preceding vehicle. The laser radar 30 can provide a sensor signal indicative of distance to and angular location of the obstacle.

A computing device 32, which is coupled to the sensing devices 18, 20, 26 and 30, evaluates the detected driver operation, vehicle motion and vehicle environment. The evaluation includes determining relative speed Vr to the obstacle based on vehicle speed V from the vehicle speed sensor 26 and distance D from the laser radar 30. Using relative speed Vr and distance D, the computing device 32 determines a degree with which the obstacle is coming close to the vehicle 12. In this embodiment, the degree is the reciprocal of time to collision (TTC) and expressed as:

$$\frac{1}{TTC} = \frac{Vr}{D} \qquad \text{Eq. 1}$$

The computing device 32 determines a desired value of deceleration accounting for the determined degree. The desired value of deceleration is used in a procedure that is carried out to prompt the driver to effecting a change in driver operation. The change in driver operation is in such a direction as to restrain an increase in the degree. The procedure includes applying braking torque to the vehicle 12 to subject the vehicle 12 to the determined value of deceleration.

In the exemplary implementation, the computing device 32 is in the form of or includes a microprocessor based controller designed to carry out cruising control by providing commands to a throttle actuator 34 and a brake actuator 36. In the exemplary implementation of the present invention, the computing device 32 is used to determine brake actuator command to the brake actuator 36, applying braking torque to road wheels of the vehicle 12 to subject the vehicle to the determined desired value of deceleration. Using the brake actuator 36 is only one example of applying braking torque. Another example is using engine braking or regenerative braking if an electric traction motor is used.

In the exemplary implementation of the present invention, the procedure includes applying reaction force at the accelerator pedal 24. The computing device 32 determines when to apply additional reaction force at accelerator pedal 22 to generate a trigger signal. The trigger signal is used as one input to another microprocessor based controller called an accelerator pedal reaction characteristic (APRC) modulator 38. The determined degree with which the obstacle is coming close to the vehicle 12 is used as another input to the APRC modulator 38. The information on accelerator pedal depressed position is used as other input to the APRC modulator 38. Such information is obtained from the accelerator pedal sensor 18. The APRC modulator 38 provides pattern of variation of reaction force with different depressed positions. Further description on this variation pattern of reaction force will be made later. The APRC modulator 38 determines a desired value of additional reaction force in response to the determined degree and provides accelerator pedal reaction force command to a servomotor 40.

Figure 3:
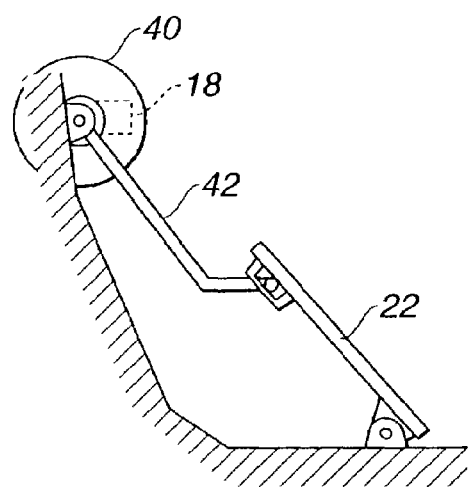
FIG. 3 is a schematic view of a servomotor of an accelerator reaction characteristic modulation actuator in operative relationship with an accelerator pedal.

As shown in FIG. 3, a link mechanism 42 operatively interconnects the servomotor 40 and the accelerator pedal 22. In the embodiment, the servomotor 40 has embedded therein the accelerator pedal sensor 20. The accelerator pedal sensor 20 of this type measures an angle of depression of the accelerator pedal 22 in terms of a rotary angle through which the servomotor 40 is forced to turn. The accelerator pedal stroke sensor 22 provides its sensor signal to the APRC modulator 38. For further information on applying additional reaction force at the accelerator pedal, reference should be made to the co-pending commonly assigned United States patent application No. unassigned yet, entitled "Driving Assist System and Method with Accelerator Pedal Reaction Force Control" claiming the priority of Japanese Patent Application No. 2002-003803, filed Jan. 10, 2002, which United States patent application has been hereby incorporated by reference in its entirety.

Figure 4A:
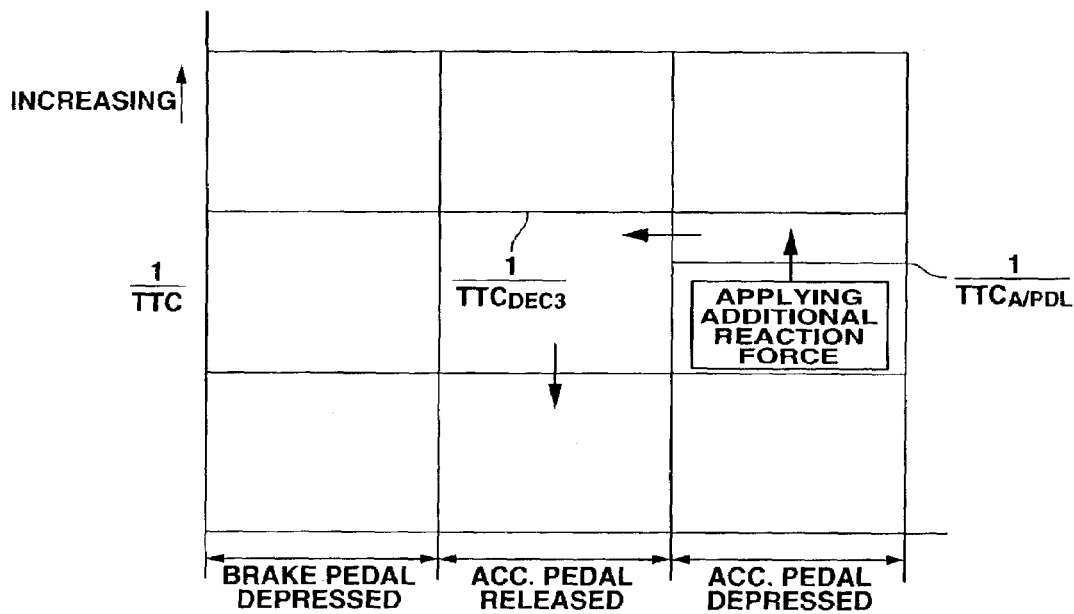
FIG. 4A is an operation chart.
Figure 4B:
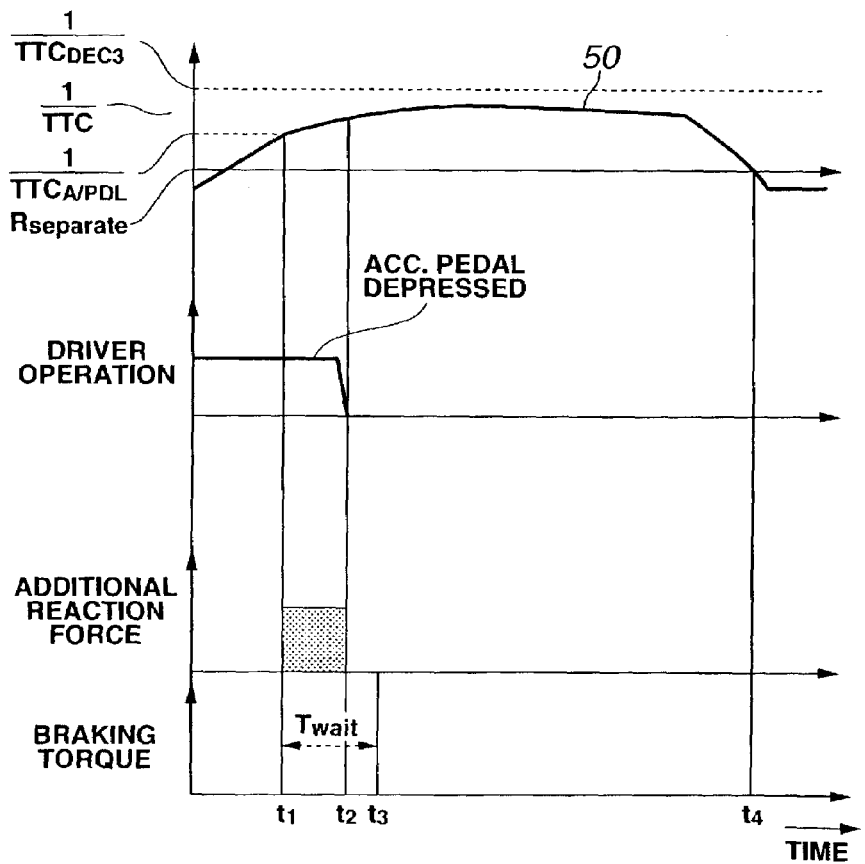
FIG. 4B is a timing diagram, both of which illustrate how the exemplary implementation of the present invention operates in one case (case 1).

FIG. 4A is an operation chart, and FIG. 4B is a timing diagram. Both FIGS. 4A and 4B illustrate how the exemplary implementation of the present invention operates. In FIG. 4B, prior to moment $t_1$, the driver keeps stepping on or depressing the accelerator pedal 22 and the degree 1/TTC with which the obstacle is coming close to the vehicle 12 rises.

At the moment $t_1$, the driver steps on the accelerator pedal 22 and the degree 1/TTC is equal to or greater than a first predetermined degree $1/TTC_{A/PDL}$. In the exemplary implementation, a time period of 6 seconds is set as a value of time to collision $TTC_{A/PDL}$. Applying additional reaction force begins with the moment $t_1$ immediately after the degree 1/TTC has exceeded the first predetermined degree $1/TTC_{A/PDL}$ under the condition that the driver is depressing the accelerator pedal 22. After the moment $t_1$, the applying additional reaction force continues to prompt the driver to releasing the accelerator pedal 22 as long as the degree 1/TTC stays greater than a separate threshold degree $R_{separate}$. The separate threshold degree $R_{separate}$ is less than the first predetermined degree $1/TTC_{A/PDL}$. In the exemplary implementation, the separate threshold degree $R_{separate}$ is zero.

Subsequently, at moment $t_2$ before expiration of a predetermined period of time $T_{wait}$, the driver releases the accelerator pedal 22 and the applying additional reaction force ends. The applying additional reaction force begins with the moment $t_1$ and continues until the driver subsequently releases the accelerator pedal 22 as long as the degree 1/TTC stays greater than or equal to the separate threshold degree $R_{separate}$. The release of accelerator pedal 22 creates engine braking, applying braking torque, thus restraining an increase in the degree 1/TTC. This may be confirmed by the illustrated curve 50 in FIG. 4B.

Figure 5A:
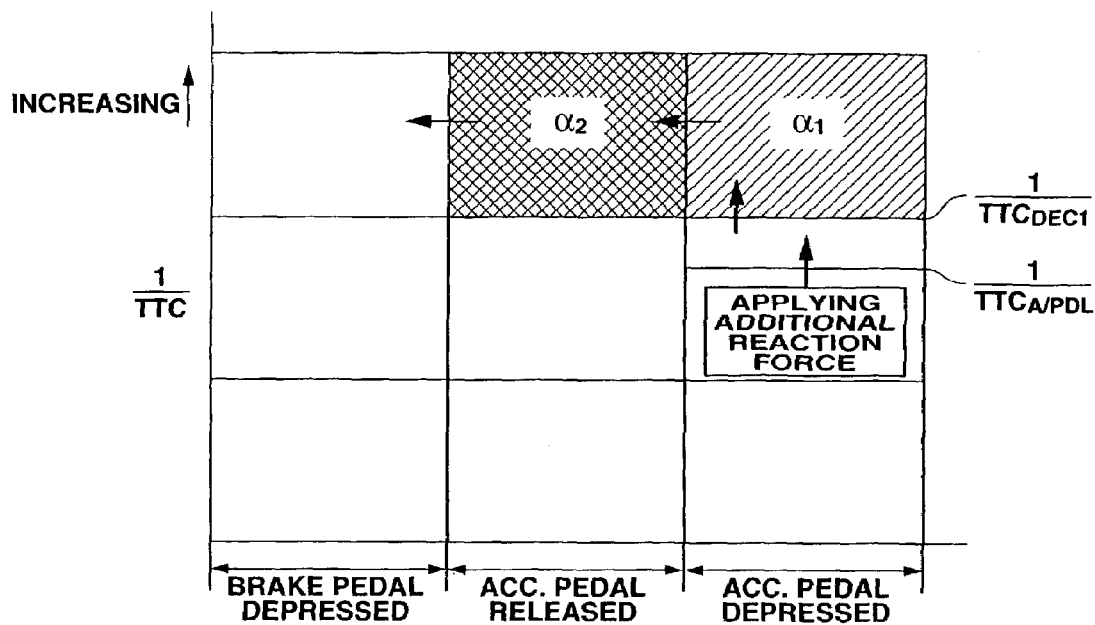
FIG. 5A is an operation chart.
Figure 5B:
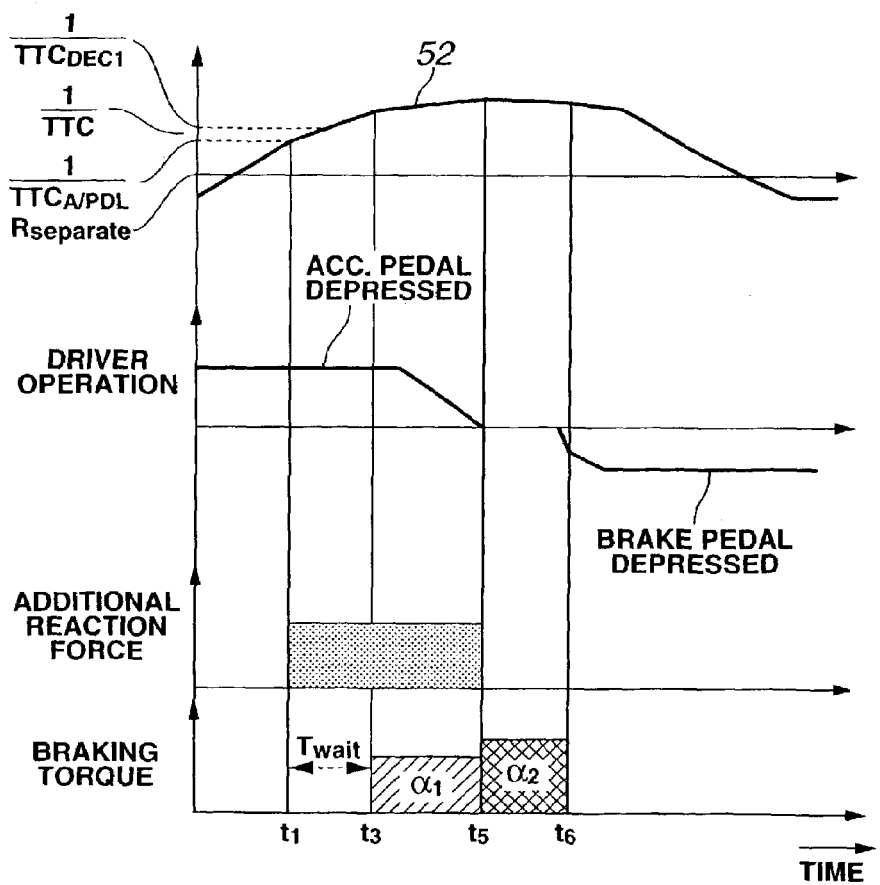
FIG. 5B is a timing diagram, both of which illustrate how the exemplary implementation of the present invention operates in another case (case 2).

In the illustrated case, the applying additional reaction force ends with the moment $t_2$ before the predetermined period of time $T_{wait}$ will expire at moment $t_3$. After the driver has released the accelerator pedal 22 (moment $t_2$), the degree 1/TTC varies with time along the curve 50. As the curve 50 clearly shows, the degree 1/TTC continues to stay greater than the separate threshold degree $R_{separate}$ until the degree 1/TTC drops down to the separate threshold degree $R_{separate}$ at moment $t_4$ without reaching another threshold degree 1/TTC$_{DEC3}$ that is greater than 1/TTC$_{A/PDL}$. The previous description on FIGS. 4A and 4B clearly indicates that the exemplary implementation carries out the procedure to prompt the driver to effecting the above-mentioned change in driver operation. The change is in such a direction as to restrain an increase in the degree 1/TTC. As may be clarified later, there is predetermined condition to be met before applying braking torque to the motor vehicle to subject the motor vehicle to the desired value of deceleration. In the illustrated case in FIGS. 4A and 4B, the procedure begins with the moment $t_1$, and the predetermined condition is not met because the degree 1/TTC does not reach 1/TTC$_{DEC3}$. Referring next to FIGS. 5A and 5B, the operation of exemplary implementation of the present invention is described. In FIG. 5B, prior to moment $t_1$, the driver keeps stepping on or depressing the accelerator pedal 22 and the degree 1/TTC with which the obstacle is coming close to the vehicle 12 rises.

At the moment $t_1$, the driver steps on the accelerator pedal 22 and the degree 1/TTC is equal to or greater than the first predetermined degree 1/TTC$_{A/PDL}$. Applying additional reaction force begins with the moment $t_1$. After the moment $t_1$, the applying additional reaction force continues to prompt the driver to releasing the accelerator pedal 22 as long as the degree 1/TTC stays greater than the separate threshold degree $R_{separate}$.

Subsequently, at the moment $t_3$ upon expiration of the predetermined period of time $T_{wait}$, the driver is still depressing the accelerator pedal 22 against the additional reaction force that continues to exist because the degree 1/TTC stays greater than or equal to the separate threshold degree $R_{separate}$. At this moment $t_3$, it is determined whether or not applying braking torque is justified. Specifically, it is determined whether or not the degree 1/TTC is greater than or equal to another predetermined threshold degree 1/TTC$_{DEC1}$. In the exemplary implementation, the predetermined threshold degree 1/TTC$_{DEC1}$ is equal to or slightly greater than the first-mentioned threshold degree 1/TTC$_{A/PDL}$. In the illustrated case, the degree 1/TTC varies with time as shown by the curve 52 in FIG. 5B, and the degree 1/TTC is greater than 1/TTC$_{DEC1}$ at the moment $t_3$, justifying the initiation of applying braking torque to the road wheels to subject the vehicle 12 to a desired value of deceleration. From the moment $t_3$ to moment $t_5$ when the driver releases the accelerator pedal 22 subsequently, the desired value of deceleration is given by a first value $\alpha 1$, which is selected from a set of values that satisfies the following relationship:

$$\alpha 1 < \frac{Vr^2}{2D} \qquad \text{Eq. 2}$$

What the right side term of the equation 2 means is that subjecting the motor vehicle 12 to the value of deceleration equal to or greater than $Vr^2/2D$ would bring the relative speed Vr to zero on or before the distance D becoming zero. In the exemplary implementation of the present invention, the first value $\alpha 1$ is expressed as, $$\alpha 1 = K \frac{Vr^2}{2D} \qquad \text{Eq. 3}$$

where K is a value falling in a range between 0 and 1.

In the exemplary implementation, K is 0.8.

Immediately after the moment $t_5$, applying braking torque continues. But, a second value $\alpha 2$ is used, instead of the first value $\alpha 1$, as the desired value of deceleration. The second value $\alpha 2$ is expressed as, $$\alpha 2 = \alpha 1 + \alpha_{fix} \qquad \text{Eq. 4}$$

where $\alpha_{fix}$ is an increment that may be determined by experiments or simulation.

In the exemplary implementation, the increment $\alpha_{fix}$ is 0.5 m/sec². In the exemplary implementation, switching from $\alpha 1$ to $\alpha 2$ is provided to let the driver feel an increase in deceleration, which s/he would expect upon releasing the accelerator pedal 22.

Applying braking torque continues as long as the degree 1/TTC stays greater than the separate threshold degree $R_{separate}$ and ends with moment $t_6$ when the driver depresses the brake pedal 24 to provide sufficient brake action that would produce braking torque high enough for application to the motor vehicle 12 instead of the braking torque being applied.

Figure 6A:
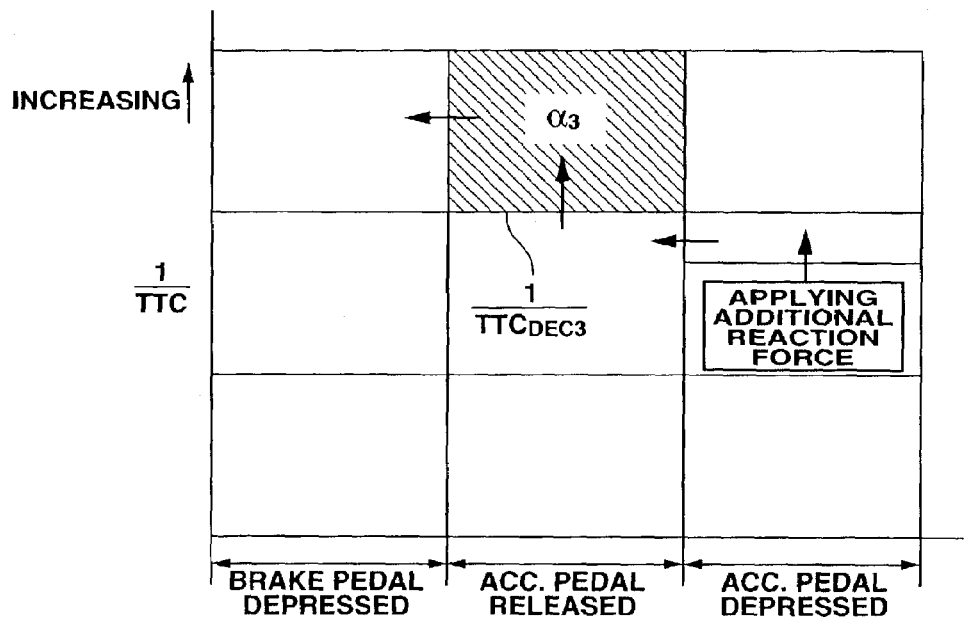
FIG. 6A is an operation chart.
Figure 6B:
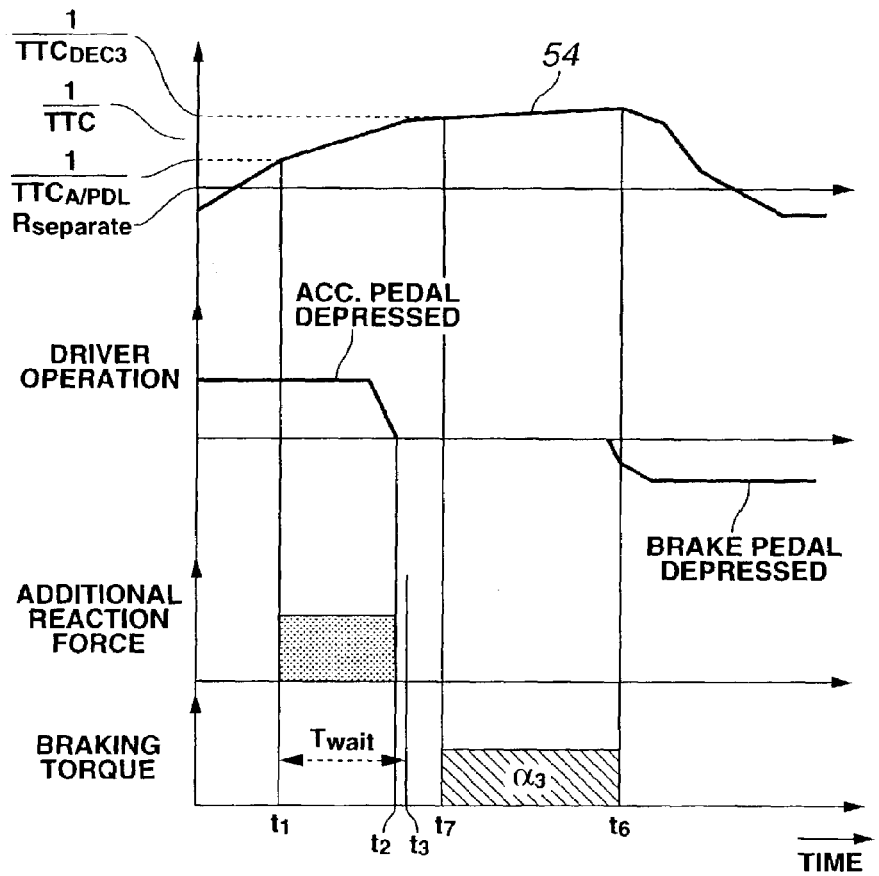
FIG. 6B is a timing diagram, both of which illustrate how the exemplary implementation of the present invention operates in another case (case 3).

Referring now to FIGS. 6A and 6B, the operation of exemplary implementation of the present invention is described. This illustrated case is substantially the same as the before described case illustrated in FIGS. 4A and 4B till the moment $t_3$. However, varying of the degree 1/TTC after the moment $t_2$ differs. As indicated by the illustrated curve 50, according to the illustrated case in FIGS. 4A and 4B, the degree 1/TTC does not reach the threshold degree 1/TC$_{DEC3}$ that is greater than 1/TTC$_{DEC1}$. According to the illustrated case in FIGS. 6A and 6B, the curve 54 clearly indicates that the degree 1/TTC reaches the threshold degree 1/TTC$_{DEC3}$ at moment $t_7$. At the moment $t_7$, the predetermined condition is met to start applying braking torque to the road wheels to subject the vehicle 12 to a desired value of deceleration. The desired value of deceleration is given by a third value $\alpha 3$, which is selected from a set of values that satisfies the following relationship:

$$\alpha 3 < \frac{Vr^2}{2D} \qquad \text{Eq. 5}$$

In the exemplary implementation of the present invention, the third value $\alpha 3$ is expressed as, $$\alpha 3 = K \frac{Vr^2}{2D} \qquad \text{Eq. 6}$$

where K is a value falling in a range between 0 and 1.

In the exemplary implementation, K is 0.8.

Applying braking torque continues as long as the degree 1/TTC stays greater than the separate threshold degree $R_{separate}$. It ends with the moment $t_6$ when the driver depresses the brake pedal 24 to provide sufficient brake action that would produce braking torque high enough for application to the motor vehicle 12 instead of the braking torque being applied.

With regard to the threshold degrees $1/TTC_{DEC1}$ (see FIG. 5B) and $1/TTC_{DEC3}$ (see FIG. 6B), a value of time to collision $TTC_{DEC3}$ is less than or equal to a value of time to collision $TTC_{DEC1}$.

Figure 7A:
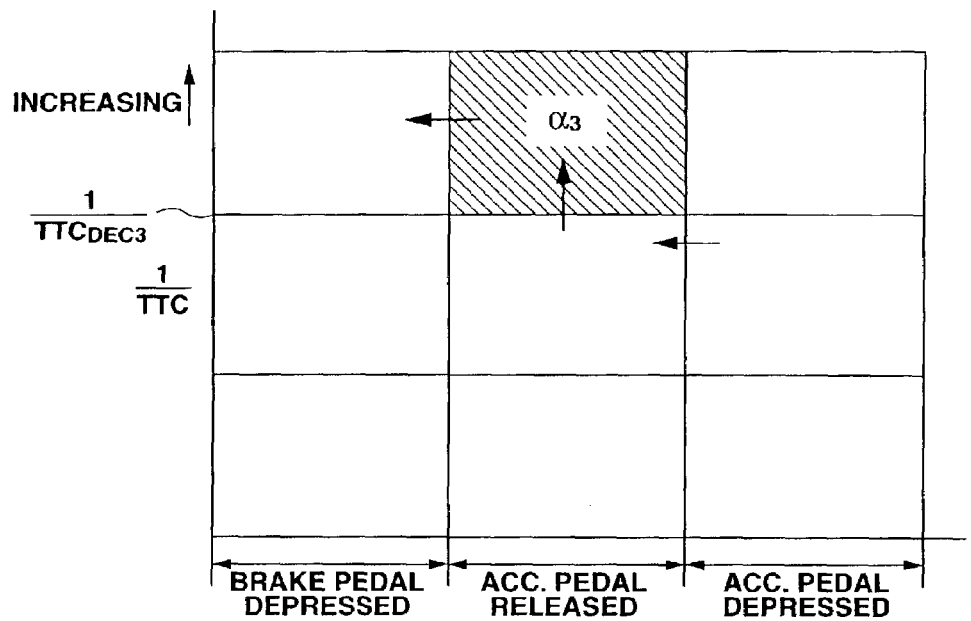
FIG. 7A is an operation chart.
Figure 7B:
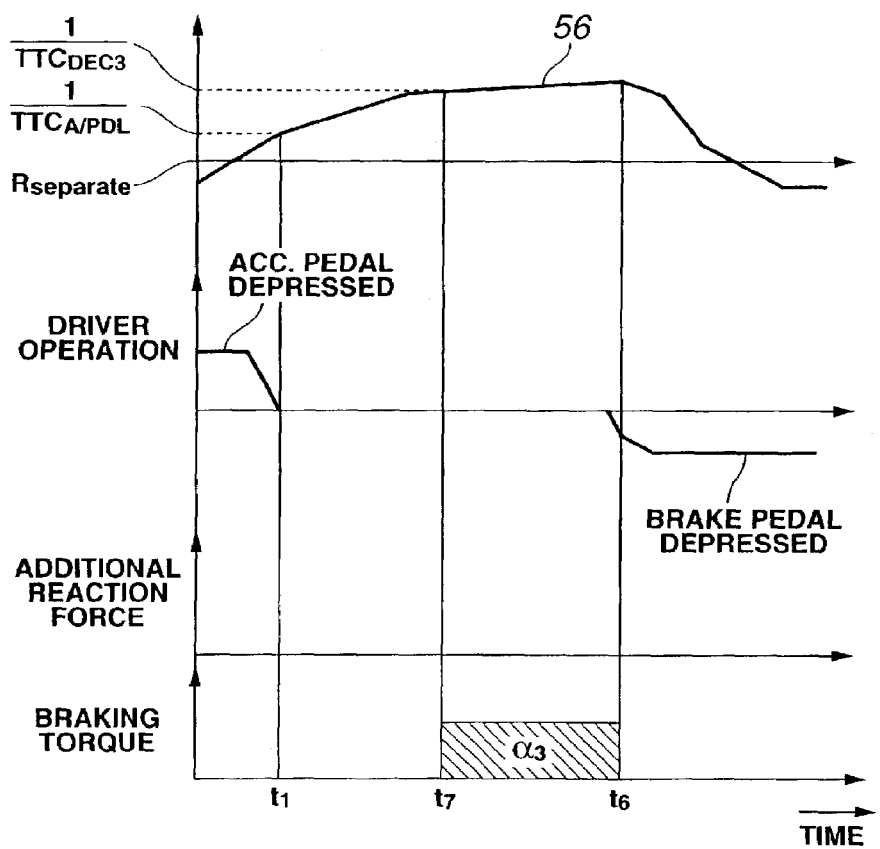
FIG. 7B is a timing diagram, both of which illustrate how the exemplary implementation of the present invention operates in another case (case 4).

Referring now to FIGS. 7A and 7B, the operation of exemplary implementation of the present invention is described. This illustrated case is substantially the same as the above described case illustrated in FIGS. 6A and 6B in that the degree 1/TTC reaches after driver releasing the accelerator pedal 22.

As shown by the illustrated curve 56 in FIG. 7B, the degree 1/TTC reaches the threshold degree $1/TTC_{DEC3}$ at moment $t_7$. At the moment $t_7$, the predetermined condition is met to start applying braking torque to the road wheels to subject the vehicle 12 to a desired value of deceleration that is given by the third value $\alpha3$. Applying braking torque continues as long as the degree 1/TTC stays greater than the separate threshold degree $R_{separate}$. It ends with the moment $t_6$ when the driver depresses the brake pedal 24 to provide sufficient brake action that would produce braking torque high enough for application to the motor vehicle 12 instead of the braking torque being applied.

The illustrated case in FIGS. 7A and 7B is different from the illustrated case in FIGS. 6A and 6B in that the driver has released the accelerator pedal 22 when the degree 1/TTC reaches the first threshold degree $1/TTC_{A/PDL}$ (moment $t_1$).

Figure 8:
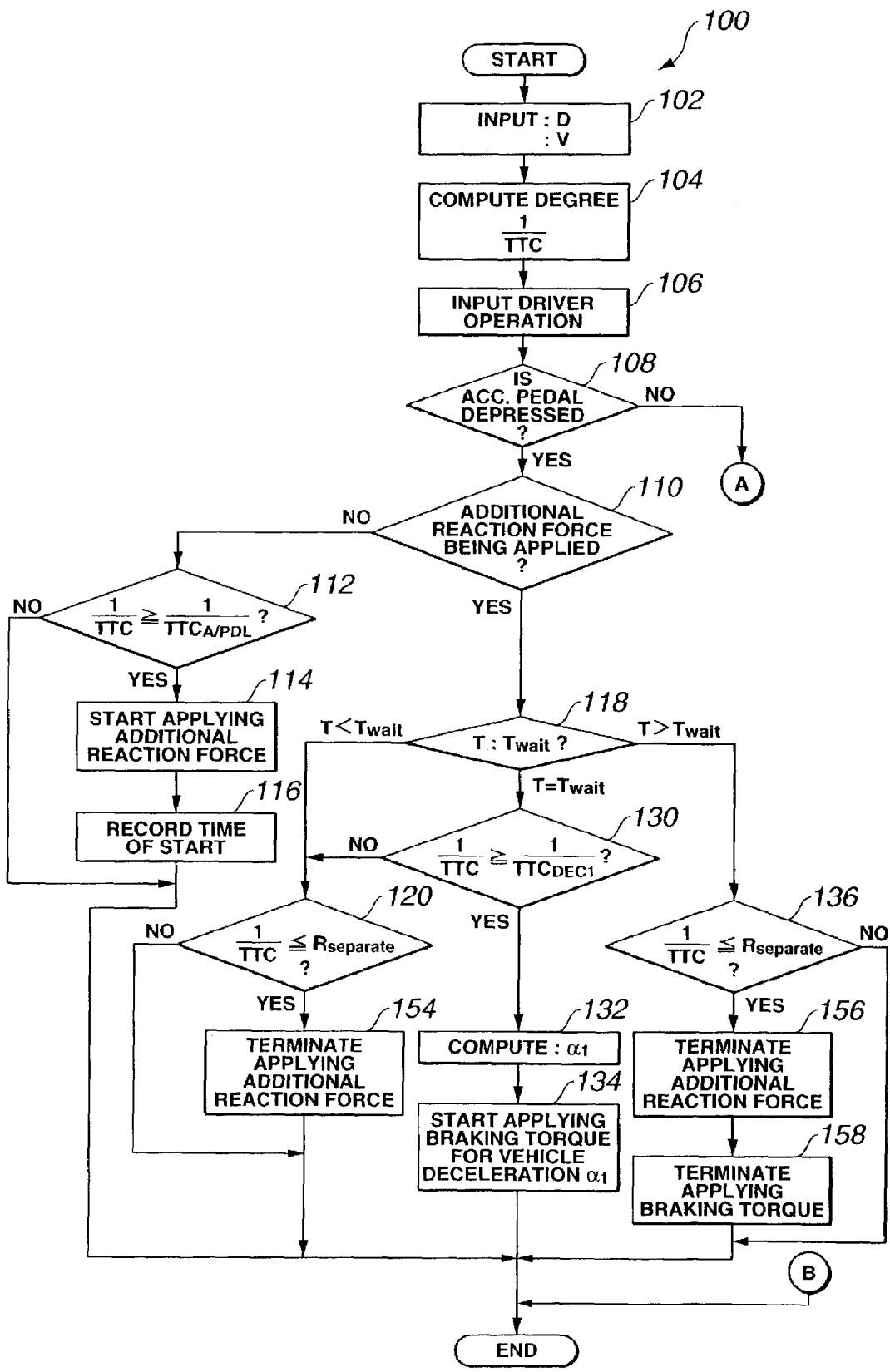
FIGS. 8 and 9 illustrate a flow diagram of a control routine implementing the present invention.
Figure 9:
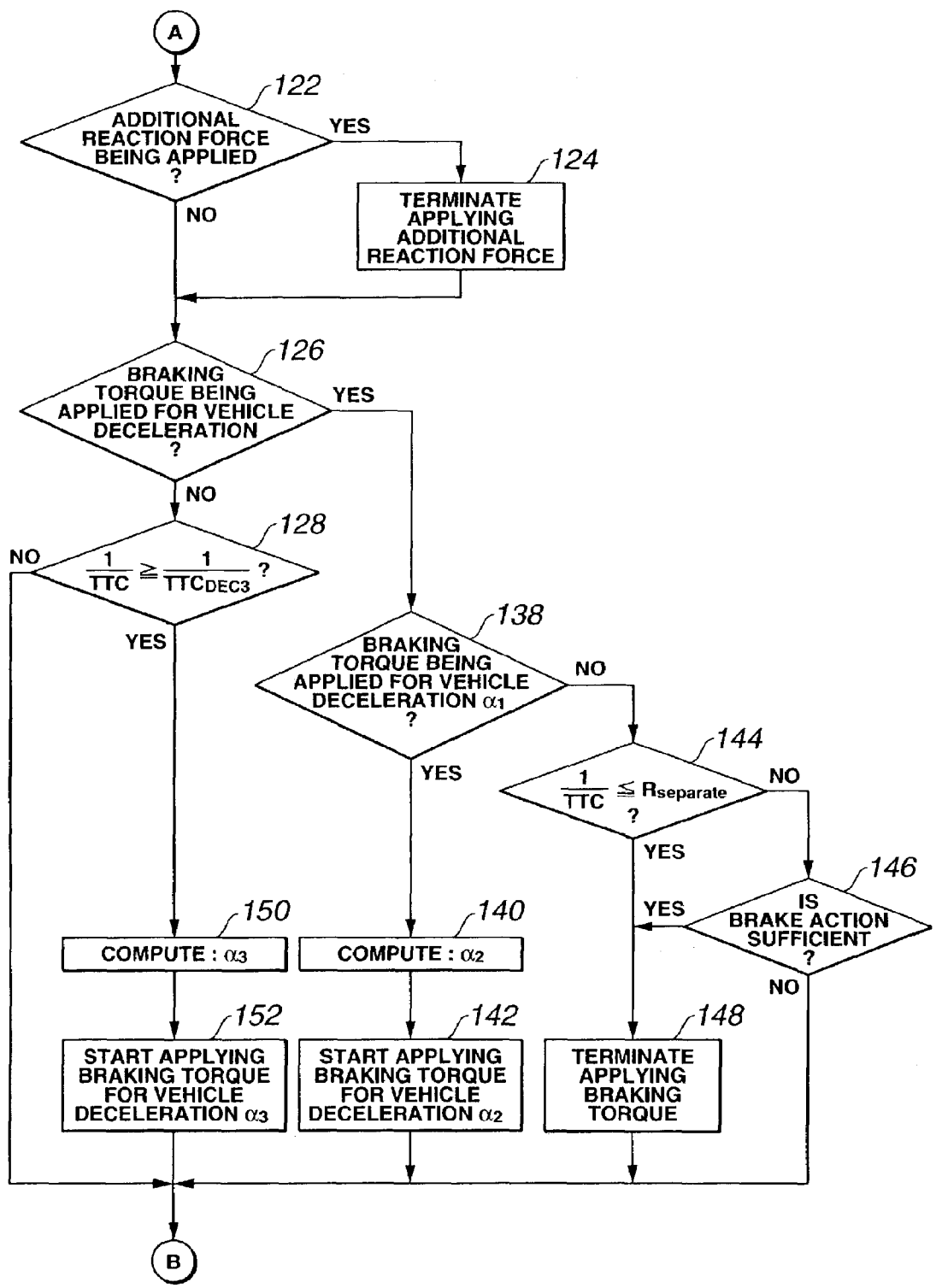

The flow diagram in FIGS. 8 and 9 illustrates a control routine 100 of the preferred implementation of the present invention. Turning on an ignition switch of the motor vehicle 12 initiates the execution of the control routine 100. The execution of the control routine 100 is repeated at regular interval of, for example, 50 milliseconds. In the implementation, programs for the control routine 100 are stored in computer readable storage media of the controller 32.

In FIG. 8, at input box 102, the controller 32 inputs information of: distance D to an obstacle coming close to the motor vehicle 12, and vehicle speed V of the motor vehicle 12. The controller 32 next computes, at box 104, the degree 1/TTC with which the obstacle is coming close to the motor vehicle 12 by using the equation 1 (Eq. 1) and inputs, at box 106, driver operation. At box 106, the controller 32 inputs information of: accelerator pedal application and brake pedal application out of sensor signals of the accelerator pedal sensor 18 and the brake pedal sensor 20.

In the illustrated case 1 in FIGS. 4A and 4B, prior to the moment $t_1$, the accelerator pedal 22 is depressed, the degree 1/TTC is less than the first threshold degree $1/TTC_{A/PDL}$, and no additional reaction force is applied at the accelerator pedal 22. At box 108, the controller 32 determines whether or not the accelerator pedal 22 is depressed. The logic goes to box 110. At box 110, the controller 32 determines whether or not additional reaction force is being applied at the accelerator pedal 22. The logic goes to box 112. At box 112, the controller determines whether or not the degree 1/TTC is equal to or greater than the first threshold degree $1/TTC_{A/PDL}$. After box 112, the logic goes to an end point.

Upon or immediately after the moment $t_1$ (FIG. 4B), the logic goes down to box 112. At box 112, the controller 32 determines that the degree 1/TTC is equal to or greater than the first threshold degree $1/TTC_{A/PDL}$. The logic goes to box 114. The controller 32 outputs a trigger signal that is used as one input to the APRC modulator 38, starting applying additional reaction force at the accelerator pedal 22. The controller 32 next records in a memory, at box 116, time as a start time $T_{start}$. After box 116, the logic goes to the end point. Although not positively shown in the flow diagram, an indication, for example, a reaction force application flag, is set while the additional reaction force is being applied at the accelerator pedal 22.

During period between the moment $t_1$ and $t_2$ (FIG. 4B), the logic goes down to box 110. At box 110, the controller 32 determines that the additional reaction force is being applied at the accelerator pedal 22. The logic goes to box 118. At box 118, the controller 32 compares elapsed time T from the recorded time $T_{start}$ to the predetermined period of time $T_{wait}$. The controller 32 determines, at box 110, that T is less than $T_{wait}$ (T<$T_{wait}$). The logic goes to box 120. At box 120, the controller 32 determines whether or not the degree 1/TTC is equal to or less than the separate threshold degree $R_{separate}$. As readily seen from the curve 50 in FIG. 4B, the controller 32 determines, at box 120, that the degree 1/TTC is greater than the separate threshold degree $R_{separate}$. After box 120, the logic goes to the end point.

Upon or immediately after the moment $t_2$, the logic goes down to box 108. As the accelerator pedal is released, the controller 32 determines, at box 108, that the accelerator pedal 22 is not depressed. The logic goes to box 122 in FIG. 9. At box 122, the controller 32 determines whether or not the additional reaction force is being applied at the accelerator pedal 22. As the additional reaction force is being applied, the controller 32 outputs, at the next box 124, a trigger release signal to be applied to the APRC modulator 38, thus terminating applying additional reaction force at the accelerator pedal 22. The logic goes to box 126. At box 126, the controller 32 determines whether or not braking torque being applied to road wheels to subject the motor vehicle 12 to deceleration. As no braking torque is applied via the brake actuator 36, the controller 32 determines, at the next box 128, whether or not the degree 1/TTC is equal to or greater than the threshold degree $1/TTC_{DEC3}$. As readily seen from the curve 50 in FIG. 4B, the controller 32 determines, at box 128, that the degree 1/TTC is less than $1/TTC_{DEC3}$. After box 128, the logic goes to the end point.

Subsequently after the moment $t_2$, the logic flows along box 122, box 126, and box 128 down to the end point.

In the illustrated case 2 in FIGS. 5A and 5B, upon or immediately after the moment $t_3$, the controller 32 determines, at box 228, that the elapsed time T is equal to $T_{wait}$. The logic goes to box 130. At box 130, the controller 32 determines whether or not the degree 1/TTC is equal to or greater than the threshold degree $1/TTC_{DEC1}$. As readily seen from the illustrated curve 52 in FIG. 5B, the controller 32 determines, at box 130, that the degree 1/TTC is greater than the threshold degree $1/TTC_{DEC1}$. The logic goes to box 132. At box 132, the controller 32 computes the first value $\alpha1$. The controller 32 outputs, at the next box 134, a brake actuator command, causing the brake actuator 36 to start applying brake torque to road wheels to subject the motor vehicle 12 to the desired value of deceleration given by the first value $\alpha1$. After box 134, the logic goes to the end point.

Subsequently, as the elapsed time T exceeds $T_{wait}$, the controller 32 determines, at box 118, that the elapsed time T is greater than $T_{wait}$. The logic goes to box 136. At box 136, the controller 32 determines whether or not the degree 1/TTC is equal to or less than the separate threshold degree $R_{separate}$. As readily seen from the curve 52 in FIG. 5B, the controller 32 determines, at box 136, that the degree 1/TTC is greater than the separate threshold degree $R_{separate}$. After box 136, the logic goes to the end point.

Upon or immediately after the moment $t_5$, the logic flows along boxes 102, 104, 106, 108, 122 and 124 and goes to box 126. The controller 32 determines, at box 126, that the braking torque is being applied. The logic goes to box 138. At box 138, the controller 32 determines whether or not braking torque is being applied for the desired value of vehicle deceleration α1. Since this is the case, the logic goes to box 140. At box 140, the controller 32 computes the second value α2. The controller 32 outputs, at the next box 142, a brake actuator command, causing the brake actuator 36 to start applying brake torque to road wheels to subject the motor vehicle 12 to the desired value of deceleration given by the second value α2. After box 142, the logic goes to the end point.

During period between the moment $t_5$ and $t_6$ (FIG. 5B), the logic goes down to box 138. Since the braking torque application for the desired value vehicle deceleration α2 has begun, the controller 32 determines, at box 138, that braking torque is not applied for the desired value of vehicle deceleration α1. The logic goes to box 144. At box 144, the controller 32 determines whether or not the degree 1/TTC is equal to or less than the separate threshold degree $R_{separate}$. As readily seen from the curve 52 in FIG. 5B, the controller 32 determines, at box 144, that the degree 1/TTC is greater than the separate threshold degree $R_{separate}$. The logic goes to box 146. At box 146, the controller 32 determines whether or not the brake action predicted by the depressed position of brake pedal 24 is sufficient. This may be simply determined by comparing the detected depressed position of the brake pedal 24 to a threshold depressed position. Since the brake pedal 24 is not depressed, the logic goes to the end point after box 146.

Upon or immediately after the moment $t_6$ (FIG. 5B), the controller 32 determines, at box 146, that the predicted brake action is sufficient. The logic goes to box 148. At box 148, the controller 32 outputs a signal, causing the brake actuator 36 to terminate applying braking torque. After box 148, the logic goes to the end point.

In the illustrated case 3 in FIGS. 6A and 6B, upon or immediately after moment $t_7$, the controller 32, determines, at box 128, that the degree 1/TTC is equal to or greater than $1/TTC_{DEC3}$. The logic goes to box 150. At box 150, the controller 32 computes the third value α3. The controller 32 outputs, at the next box 152, a brake actuator command, causing the brake actuator 36 to start applying brake torque to road wheels to subject the motor vehicle 12 to the desired value of deceleration given by the third value α3. After box 152, the logic goes to the end point.

During period between the moment $t_7$ and $t_6$ (FIG. 6B), the logic goes down to box 138. Since the braking torque application for the desired value vehicle deceleration α3 has begun, the controller 32 determines, at box 138, that braking torque is not applied for the desired value of vehicle deceleration α1. The logic goes to box 144. As readily seen from the curve 54 in FIG. 6B, the controller 32 determines, at box 144, that the degree 1/TTC is greater than the separate threshold degree $R_{separate}$. The logic goes to box 146. At box 146, the controller 32 determines that the brake action predicted by the depressed position of brake pedal 24 is insufficient because the brake pedal 24 is not depressed. The logic goes to the end point after box 146.

Upon or immediately after the moment $t_6$ (FIG. 6B), the controller 32 determines, at box 146, that the predicted brake action is sufficient. The logic goes to box 148. At box 148, the controller 32 outputs a signal, causing the brake actuator 36 to terminate applying braking torque. After box 148, the logic goes to the end point.

In the illustrated case 4 in FIGS. 7A and 7B, since the accelerator pedal 22 is not depressed, the logic always flow along boxes 102, 104, 106, 108, 122, 126 and 128 upon or after the moment $t_1$.

Upon or immediately after the moment $t_7$ (FIG. 7B), the controller 32 determines, at box 128, that the degree 1/TTC is equal to or greater than $1/TTC_{DEC3}$ The logic goes to box 150. At box 150, the controller 32 computes the third value α3. The controller 32 outputs, at the next box 152, a brake actuator command, causing the brake actuator 36 to start applying brake torque to road wheels to subject the motor vehicle 12 to the desired value of deceleration given by the third value α3. After box 152, the logic goes to the end point.

The operation after the moment $t_7$ in FIG. 7B is the same as the operation in FIG. 6B.

The procedure mentioned above is immediately terminated when the degree 1/TTC drops down to or below the separate threshold degree $R_{separate}$.

If, at box 120, it determines that the degree 1/TTC is equal to or less than $R_{separate}$, the controller 32 outputs, at the next box 154, a trigger release signal to be applied to the APRC modulator 38, thus terminating applying additional reaction force at the accelerator pedal 22. After box 154, the logic goes to the end point.

If, at box 136, it determines that the degree 1/TTC is equal to or less than $R_{separate}$, the controller 32 outputs, at the next box 156, a trigger release signal to be applied to the APRC modulator 38, thus terminating applying additional reaction force at the accelerator pedal 22. At the next box 158, the controller 32 outputs a signal, causing the brake actuator 36 to terminate applying braking torque. After box 158, the logic goes to the end point.

If, at box 144, it determines that the degree 1/TTC is equal to or less than $R_{separate}$, the controller 32 outputs, at box 148, a signal, causing the brake actuator 36 to terminate applying braking torque. After box 148, the logic goes to the end point.

From the preceding description, it will be appreciated that the exemplary implementation of the present invention provides a driver assisting system or method for a motor vehicle. Driver operation, vehicle motion and vehicle environment are detected. The detected driver operation, vehicle motion and vehicle environment are evaluated. Based on the evaluation, the driver is prompted to effecting a change in driver operation by applying braking torque to the motor vehicle and/or additional reaction force at the accelerator. The change in driver operation is in such a direction as to restrain an increase in degree with which the obstacle is coming close to the motor vehicle.

While the present invention has been particularly described, in conjunction with various implementations of the present invention, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2002-073878, filed Mar. 18, 2002, the disclosure of which is hereby incorporated by reference in its entirety.

What is claimed is:

1. A system for assisting a driver of a motor vehicle, comprising:

a plurality of sensing devices for detecting driver operation, vehicle motion and vehicle environment, the vehicle environment including an obstacle in a field around the motor vehicle;

a computing device coupled to the plurality of sensing devices for determining a degree with which the obstacle is coming close to the motor vehicle to determine a desired value of deceleration accounting for the determined degree; and a vehicle control application for carrying out a procedure to prompt the driver to effect a change in driver operation so as to restrain an increase in the degree with which the obstacle is coming close to the vehicle, the procedure including applying braking torque to the motor vehicle based on the desired value of deceleration, to prompt the driver to effect the change in driver operation.

2. The system as claimed in claim 1, wherein the procedure includes altering reaction force at an accelerator pedal based on the degree.

3. The system as claimed in claim 1, wherein the procedure begins with a first moment immediately after the degree has exceeded a threshold degree when the driver is depressing an accelerator pedal.

4. The system as claimed in claim 1, wherein the computing device determines, as the desired value of deceleration, a first value based on distance to and relative speed to the obstacle and wherein the computing device determines, as the desired value of deceleration, a second value by correcting the first value when the driver releases the accelerator pedal after beginning of the procedure.

5. The system as claimed in claim 4, wherein the correcting the first value is in the form of adding an increment to the first value.

6. The system as claimed in claim 1, wherein the computing device determines, as the desired value of deceleration, a value of deceleration based on distance to and relative speed to the obstacle and keeps the determined value unaltered after the procedure has begun.

7. The system as claimed in claim 1, wherein the applying braking torque ends with a moment when the driver depresses a brake pedal.

8. The system as claimed in claim 1, wherein the computing device predicts deceleration due to brake action from a depressed angle of a brake pedal; and
wherein the applying braking torque ends with a moment when the predicted deceleration exceeds the desired value of deceleration.

9. The system as claimed in claim 1, wherein the applying braking torque ends with a moment when the degree drops below a separate threshold degree.

10. The system as claimed in claim 2, wherein the applying braking torque begins with a moment when the driver keeps depressing the accelerator pedal as opposed to the altered reaction force beyond a predetermined period of time.

11. The system as claimed in claim 10, wherein the altering reaction force is in the form of applying additional reaction force at the accelerator pedal.

12. The system as claimed in claim 1,
wherein the procedure includes prompting the driver to releasing an accelerator pedal in response to the degree;
wherein the applying braking torque begins with a moment when the driver keeps depressing the accelerator pedal beyond a predetermined period of time after beginning of the prompting the driver to releasing the accelerator pedal.

13. The system as claimed in claim 12, wherein the prompting the driver to releasing an accelerator pedal is in the form of applying additional reaction force at the accelerator pedal.

14. A method for assisting a driver of a motor vehicle, comprising:
detecting driver operation, vehicle motion and vehicle environment, the vehicle environment including an obstacle in a field around the motor vehicle;
determining a degree with which the obstacle is coming close to the motor vehicle to determine a desired value of deceleration accounting for the determined degree; and
carrying out a procedure to prompt the driver to effect a change in driver operation, so as to restrain an increase in the degree with which the obstacle is coming close to the vehicle, the procedure including applying braking torque to the motor vehicle based on the desired value of deceleration, to prompt the driver to effect the change in driver operation.

15. A method for assisting a driver of a motor vehicle having an accelerator, comprising:
detecting driver operation, vehicle motion and vehicle environment, the vehicle environment including an obstacle in a field around the motor vehicle;
evaluating the detected driver operation, vehicle motion and vehicle environment; and
prompting, based on the evaluation, the driver to effect a change in driver operation by applying at least one of braking torque to the motor vehicle and additional reaction force at the accelerator, so as to restrain an increase in degree with which the obstacle is coming close to the motor vehicle based on the desired value of deceleration, to prompt the driver to effect the change in driver operation.

16. The method as claimed in claim 15, wherein the detecting driver operation, vehicle motion and vehicle environment includes obtaining information indicated by a plurality of signals that include accelerator application, brake pedal application, vehicle speed, and distance to the obstacle.

17. The method as claimed in claim 15, wherein the evaluating the detected driver operation, vehicle motion and vehicle environment includes determining relative speed to the obstacle.

18. The method as claimed in claim 15, wherein the applying additional reaction force begins immediately after the degree has exceeded a predetermined threshold degree when the driver manipulates the accelerator.

19. The method as claimed in claim 18, wherein the applying additional reaction force continues until the driver subsequently releases the accelerator pedal as long as the degree remains greater than a separate threshold degree that is less than the first-mentioned predetermined threshold degree.

20. The method as claimed in claim 19, wherein the applying braking torque begins when the degree exceeds another threshold degree that is greater than the first-mentioned threshold degree.

21. The method as claimed in claim in claim 19, wherein the applying braking torque begins when the driver keeps manipulating the accelerator upon expiration of a predetermined period of time.

22. The method as claimed in claim 20, wherein the applying braking torque ends when the driver depresses a brake pedal to provide brake action that would apply braking torque high enough for application to the motor vehicle instead of the braking torque being applied.

23. The method as claimed in claim 21, wherein the applying braking torque ends with a moment when the driver depresses a brake pedal to provide brake action that would apply braking torque high enough for application to the motor vehicle instead of the braking torque being applied.

24. The method as claimed in claim 18, wherein the applying additional reaction force ends immediately after the degree has dropped to a release threshold degree.

25. The method as claimed in claim 20, wherein the applying braking torque ends immediately after the degree has dropped to a release threshold degree.

26. The method as claimed in claim 21, wherein the applying braking torque and the applying additional reaction force end immediately after the degree has dropped to a release threshold degree.

27. A system for assisting a driver of a motor vehicle, comprising:
    means for detecting driver operation, vehicle motion and vehicle environment, the vehicle environment including an obstacle in a field around the motor vehicle;
    means for determining a degree with which the obstacle is coming close to the motor vehicle to determine a desired value of deceleration accounting for the determined degree; and
    means for carrying out a procedure to prompt the driver to effect a change in driver operation, so as to restrain an increase in the degree with which the obstacle is coming close to the motor vehicle, the procedure including applying braking torque to the motor vehicle based on the desired value of deceleration, to prompt the driver to effect the change in driver operation.

* * * * *